United States Patent
Hughes (10) Patent No.: US 7,314,218 B2
(45) Date of Patent: Jan. 1, 2008

(54) EXTERNALLY MOUNTABLE SPIRAL ADAPTOR

(75) Inventor: Paul Hughes, Halifax (CA)

(73) Assignee: Enviroseal Engineering Products, Ltd., Waverly (CA)

(*) Notice: Subject to any disclaimer, the term of this patent is extended or adjusted under 35 U.S.C. 154(b) by 0 days.

(21) Appl. No.: 11/606,032

(22) Filed: Nov. 30, 2006

(65) Prior Publication Data

US 2007/0075501 A1    Apr. 5, 2007

Related U.S. Application Data

(63) Continuation of application No. 10/498,812, filed as application No. PCT/CA02/020002 on Dec. 12, 2002, now abandoned.

(30) Foreign Application Priority Data

Jan. 3, 2002    (CA) ................................ 2366696

(51) Int. Cl.
*F16J 15/34* (2006.01)
(52) U.S. Cl. .................. 277/349; 277/411; 277/412; 277/430; 277/585; 277/512
(58) Field of Classification Search ........ 277/411–412, 277/431, 430, 425, 585, 512–516, 349
See application file for complete search history.

(56) References Cited

U.S. PATENT DOCUMENTS 4,071,254 A * 1/1978 Raimondi et al. .......... 277/347
4,301,893 A * 11/1981 St. Jean et al. ............. 277/516
4,302,020 A * 11/1981 Morales ..................... 277/530

FOREIGN PATENT DOCUMENTS

WO    WO 03/010451 A1 *  2/2003

\* cited by examiner

*Primary Examiner*—Vishal Patel
(74) *Attorney, Agent, or Firm*—Jones, Tullar & Cooper, P.C.

(57) ABSTRACT

An adaptor that can be used with rotary fluid equipment will protect mechanical seals and/or packing material adjacent a seal cavity (18) of the equipment. The adaptor includes an annular body (30) with a central bore (32) adapted to receive a shaft (12) of the equipment. When used with mechanical seals the adaptor is receivable in the cavity at the entrance thereto and it has a portion which surface which effects contact with a complementary surface of the seal. When used with packing the adaptor fits within the cavity and defines an outboard extension in which the packing can be received. The bore defines two portions, one of which is close to the shaft (52) and another portion (54) which flares outwardly from the one portion towards the outboard end of the adaptor. Each bore portion has a spiral groove (56, 58) therein, which groove serves to redirect contaminant material contained in fluids surrounding the shaft away from the seal cavity.

12 Claims, 12 Drawing Sheets

EXTERNALLY MOUNTABLE SPIRAL ADAPTOR

CROSS REFERENCE TO RELATED APPLICATIONS

This application is a continuation under 35 U.S.C. 1.20 of U.S. application Ser. No. 10/498,812, filed Jun. 21, 2004, now abandoned which is a National Phase filing under 35 U.S.C. 371 of International Application No. PCT/CA02/020002, filed Dec. 12, 2002.

FIELD OF THE INVENTION

The present invention relates to an adaptor that can be used with rotatable fluid equipment, such as pumps, and which will protect mechanical seals and packing adjacent a seal cavity of the equipment.

BACKGROUND OF THE INVENTION

Spiral throat bushings are available from EnviroSeal Engineering Products Ltd. of Waverley, Nova Scotia, Canada under the SpiralTrac™ name. These patented devices (U.S. Pat. No. 5,553,868) have a spiral groove formed in a sloping face thereof and are generally positioned at the "bottom" of a seal cavity defined in part by a rotating shaft, a shaft housing, and a throat structure. The seal cavity typically, as well, may be filled with conventional packing or it may include a mechanical seal adjacent the end opposite the throat structure. These spiral bushings are intended to remove particulate material that may accumulate within the seal cavity during operation of the equipment, and may be augmented by flush fluids to help in material removal. The result of using these "internal" spiral throat bushings has been increased seal or packing life due to a significant reduction in wear.

Mechanical seals are designed to prevent leakage of process fluid to atmosphere, and are typically offered in a split or solid cartridge design. Typically, the seal is fastened to the face of the seal cavity housing by some mechanical means, such as threaded bolts or rods. The operation of the rotating equipment could be enhanced further if there was less particulate material entering the seal cavity from the vicinity of the mechanical seal.

Packing material is typically provided in annular rings and one or more such packing rings can be placed in a seal cavity and surrounding the rotating shaft. Again, operation of rotating equipment could be enhanced further if there were less particulate material entering the seal cavity past or from the vicinity of such packing material.

SUMMARY OF THE INVENTION

This need for reduction of particulate or contaminant material from the exterior of the seal cavity has led to the development of an "external" spiral adaptor or bushing that is positioned between the mechanical seal or packing and the end face of the seal cavity housing and which serves to increase the cleanliness of the environment in which the sealing mechanism, whether mechanical seal or packing, functions.

The advantage to this arrangement is that with the spiral adaptor being located closer to the sealing mechanism the existing patented technology of the bushing or adaptor will protect the sealing mechanism from particulate material entering at or near the sealing area. By doing this, the intent is to allow the sealing mechanism to operate in a cleaner environment with the result being extended operating life. The externally mounted design is available in a split and non-split (solid) design. The advantage of the split design is that the equipment does not have to be disassembled and the benefit of the spiral adaptor technology can be utilized. There are enormous savings for the customer if this can be avoided. The advantage of the solid design resides in the spiral adaptor technology and the benefit of a cleaner operating environment.

The externally designed spiral adaptor of this invention will create an enclosed cavity for the rotating component of a mechanical seal. Furthermore, it is possible to dimension the outboard side of the device to accept virtually any mechanical seal or packing material that is available on the market. The mechanical seal or packing being utilized will determine the cavity depth of the externally mountable spiral adaptor of the invention.

In summary of the foregoing, and in one embodiment, the present invention may be broadly set forth as a spiral adaptor for location at an entrance to an annular seal cavity of rotating equipment, such seal cavity being defined by a outer cylindrical surface of a rotatable shaft of such equipment and a shaft housing surrounding at least a portion of the shaft, the cavity having a bottom end, an entrance end and an outer cylindrical surface, the equipment including a mechanical seal positioned outboard of the shaft housing adjacent the entrance to the seal cavity. The adaptor comprises: an annular adaptor body having a central bore therethrough, the adaptor body including a first annular portion receivable within the seal cavity at the entrance thereto and a second annular portion of greater diameter than the first annular portion, the second annular portion having an inboard radial surface adapted for contact with a complementary face of the shaft housing and an outboard radial surface adapted for contact with a complementary face of the mechanical seal; the bore including a first portion defining an annular gap with the shaft outer cylindrical surface when the adaptor is in its operating position and a second portion which flares outwardly from the first bore portion towards said outboard radial surface, the first and second bore portions each including a spiral groove formed therein, the hand thereof being in the same direction as the rotation of the shaft, the groove serving to redirect contaminant material contained in fluids surrounding the shaft away from said the cavity.

In another related embodiment the present invention may be considered as providing a spiral adaptor for location at an entrance to an annular seal cavity of rotating equipment, such seal cavity being defined by a outer cylindrical surface of a rotatable shaft of such equipment and a shaft housing surrounding at least a portion of the shaft, the cavity having a bottom end, an entrance end and an outer cylindrical surface, the equipment including a mechanical seal positioned outboard of the shaft housing adjacent the entrance to the seal cavity, the adaptor comprising: an annular adaptor body receivable within the seal cavity at the entrance thereto and having a central bore therethrough; the adaptor body including an outboard radial surface adapted for contact with a complementary face of the mechanical seal; the bore including a first portion defining an annular gap with the shaft outer cylindrical surface when the adaptor is in its operating position and a second portion which flares outwardly from the first bore portion towards the outboard radial surface, the first and second bore portions each including a spiral groove formed therein, the hand thereof being in the same direction as the rotation of the shaft, the groove serving to redirect contaminant material contained in fluids surrounding the shaft away from the seal cavity.

In yet another related embodiment the present invention may be considered as providing a spiral adaptor for location within an annular seal cavity of rotating equipment, such seal cavity being defined by a outer cylindrical surface of a rotatable shaft of such equipment and a shaft housing surrounding at least a portion of the shaft, the cavity having a bottom end, an entrance end and an outer cylindrical surface, the adaptor comprising: an annular adaptor body receivable within the seal cavity and having a central bore therethrough; the adaptor body including a first annular body portion positionable at the bottom end of the seal cavity and a second annular body portion outboard the first body portion; the bore including a first portion defining an annular gap with the shaft outer cylindrical surface when the adaptor is in its operating position and a second portion which flares outwardly from the first bore portion towards a radially inwardly tapering central portion, the first, second and central bore portions each including a spiral groove formed therein, the hand thereof being in the same direction as the rotation of the shaft, the groove serving to redirect contaminant material contained in fluids surrounding the shaft away from said the cavity; and the adaptor also including an annular extension portion extending from the second annular portion to an outboard end of the adaptor, the extension portion including a blind bore therein which, with the shaft outer cylindrical surface, defines an annular cavity for reception of one or more packing rings.

The present invention will now be described with reference to the drawings.

DESCRIPTION OF THE PREFERRED AND OTHER EMBODIMENTS

Figure 1:
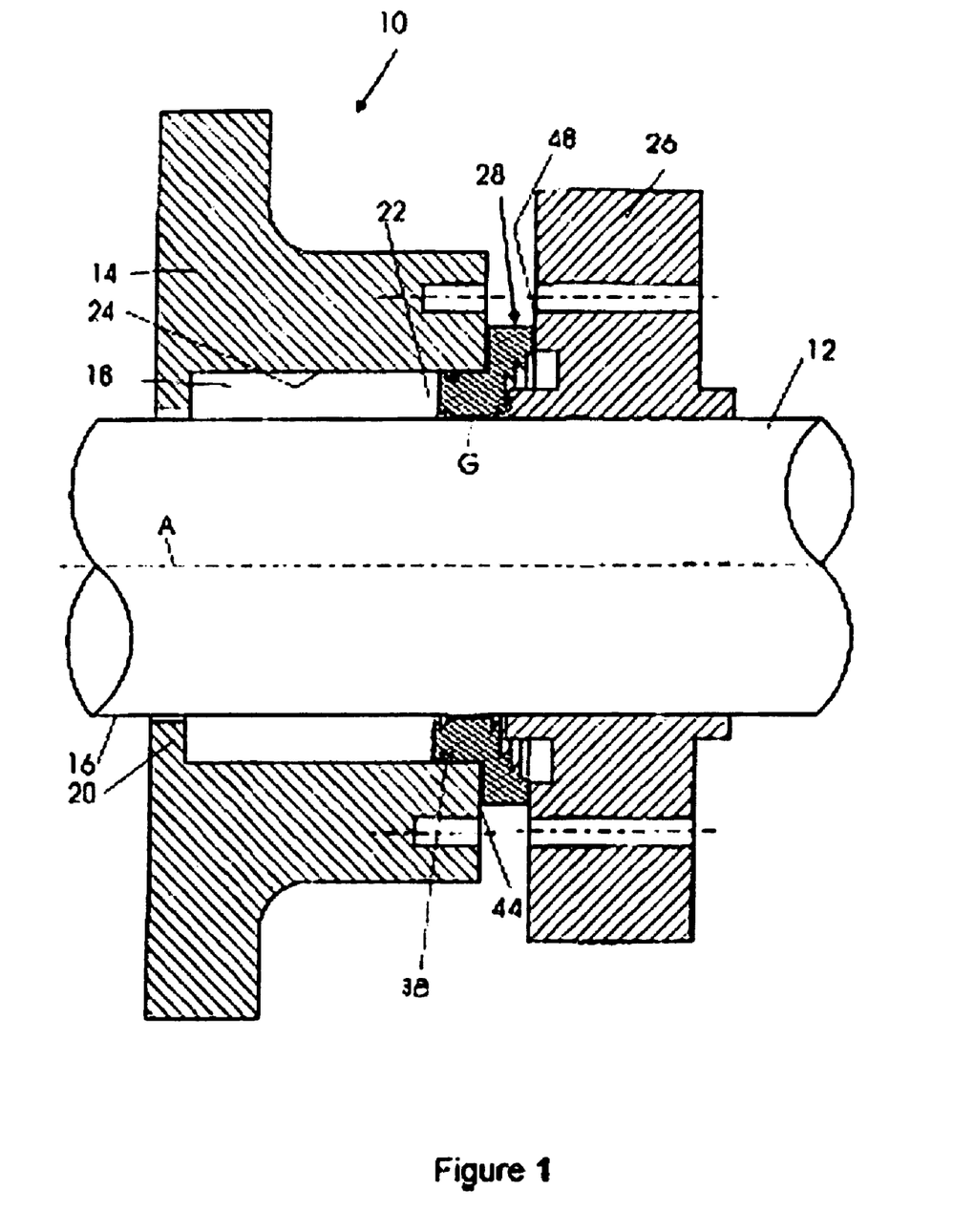
FIG. 1 illustrates in partial cross-section a typical environment for a spiral adaptor of the present invention, as located at the entrance to the seal cavity of rotating fluid equipment.

FIG. 1 of the drawings illustrates a typical environment in which a spiral adaptor of the present invention will be useful. Such environment is found in rotating fluid equipment which equipment 10 will include a rotatable shaft 12, bearingly mounted on an axis A, and surrounded at least in part by a shaft housing 14. The housing 14 defines with an outer cylindrical surface 16 of the shaft 12 an annular seal cavity 18 having a bottom end defined by radial flange 20, an entrance end 22 and an outer cylindrical surface 24. A mechanical seal 26 is typically positioned outboard of the seal cavity adjacent the shaft housing at the entrance to the seal cavity. The details of the mechanical seal are not germane to the present invention and will not be described herein.

As seen in FIG. 1 there is an external spiral adaptor 28 of the present invention located at the entrance to the seal cavity, positioned so as to be between the housing 14 and the mechanical seal 26. The adaptor 28 is described in greater detail with reference to FIG. 2.

Figure 2:
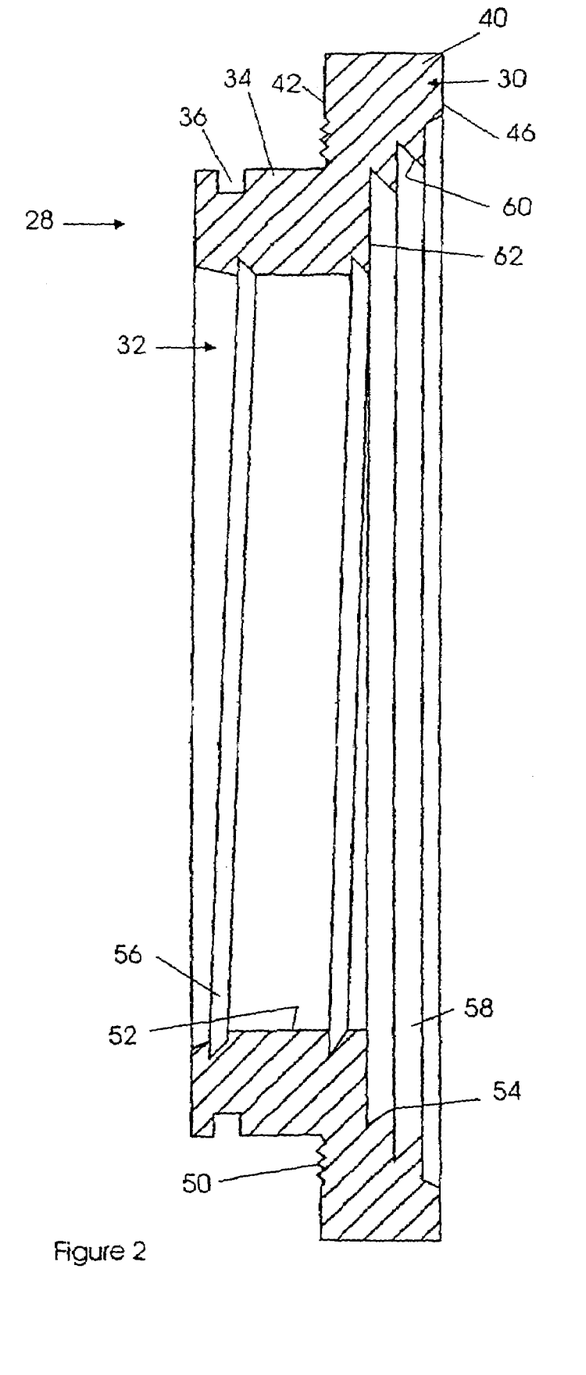
FIG. 2 illustrates in enlarged cross-section a first embodiment of the spiral adaptor 35 of the present invention.

Turning now to FIG. 2 a spiral adaptor 28 in accordance with the present invention will now be described. It is expected that this embodiment will be the one most commonly used in existing and new rotary equipment and it is the one depicted in position in FIG. 1. As with all of the embodiments to the described herein the spiral adaptor 28 can be machined from a single billet of suitable material, such as stainless steel, PTFE, or PEEK. A composite such as PTFE or PEEK is preferred since the machining time therefore is much less than with a metal. As is common in the adaptor art the spiral adaptor of the present invention may be formed as a solid (unitary) ring or it may be split into two or more sections or segments, typically along a vertical or a horizontal axis. If a split adaptor is used then the sections or segments thereof will have suitable mating pins and holes to align the sections or segments together, as well as appropriate fastening means, such as machine screws, to hold them together.

The adaptor 28 has an annular adaptor body 30 having a central bore 32 extending therethrough. The adaptor body includes a first annular portion 34 which is adapted for a tight fit within the seal cavity 18 at the entrance 22 thereto. The annular portion 34 may include a circumferential groove 36 therein for reception of an annular sealing member 38 (FIG. 1) such as an O-ring which will have sealing engagement with the outer cylindrical surface 24 of the seal cavity 18 when the spiral adaptor is in position. The adaptor body includes a second annular portion 40 of diameter greater than that of the first annular portion 34. The second annular portion 40 has an inboard radial surface 42 adapted for contact with a complementary face surface 44 of the shaft housing 14 and an outboard radial surface 46 adapted for contact with a complementary face surface 48 of the mechanical seal 26. The inboard radial surface 42 may be provided with a ribbed gasket surface 50 for sealing engagement with the complementary surface 44 of the housing 14.

It will be seen that the adaptor body bore 32 includes two portions, a first portion 52 which defines an annular gap G (FIG. 1) with the outer cylindrical surface 16 of the shaft 12 and a second portion 54 which flares outwardly from the outboard end of the first portion 52 towards the outboard radial surface 46 of the second annular body portion 40. Each of the bore portions 52, 54 is provided with its own spiral groove 56, 58 respectively therein, the hand of the spiral grooves 56, 58 being in the same direction of the rotation of the shaft 12. The grooves 56, 58 serve to redirect any contaminant-containing fluids away from the seal cavity such that damaging particulate material or other contaminants contained within operating fluids will not enter the seal cavity.

The grooves 56, 58 are similar to those described in aforementioned U.S. Pat. No. 5,553,868 in that they include both radial and non-radial portions. The non-radial portions 60 extend non-radially into the body of the adaptor from the respective bore portion and the radial portions 62 extend radially from the inner end of the respective non-radial portion back towards the bore. The groove 56 of the first bore portion 52 will lead smoothly into the groove 58 of the second or flared bore portion 54.

Although not shown specifically within the drawings there could be one or more 5 additional grooves formed within the adaptor body and located between the first and second grooves 56, 58 also as described in U.S. Pat. No. 5,553,868.

Figure 3:
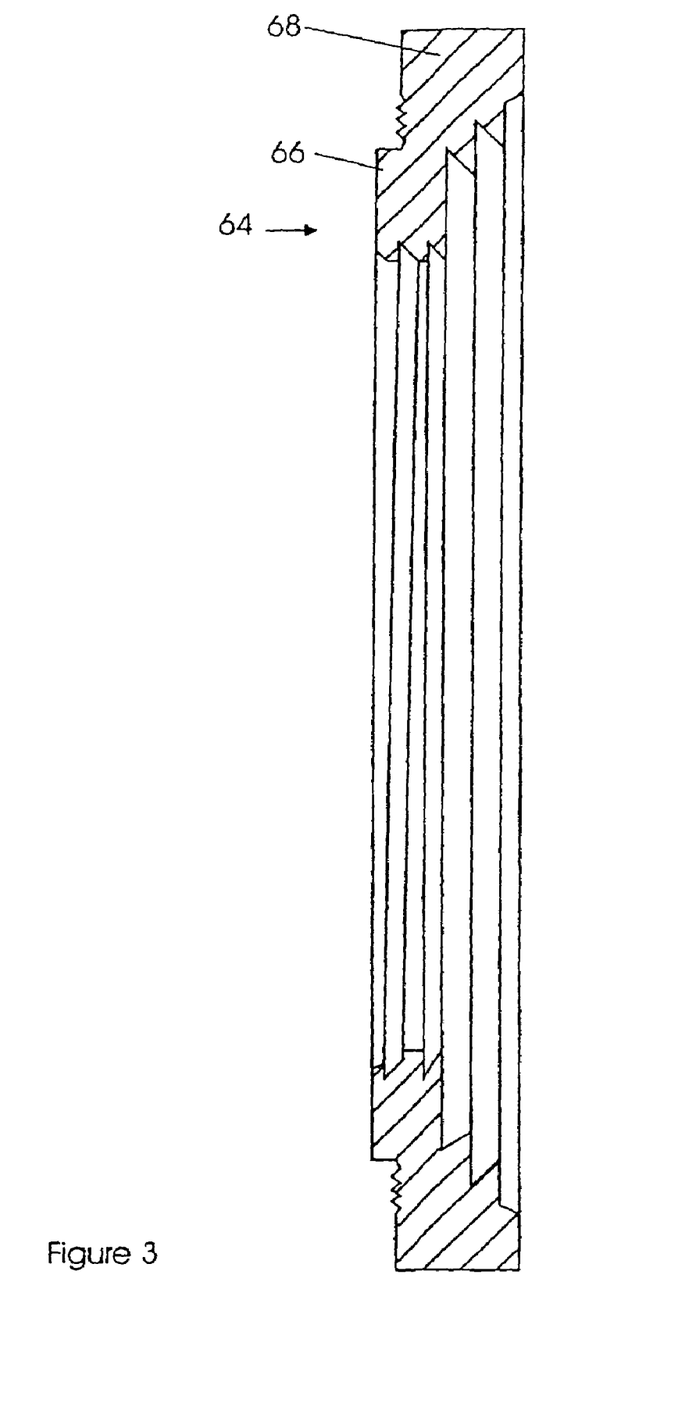
FIG. 3 illustrates in enlarged cross-section a second embodiment of the spiral adaptor of the present invention.

FIG. 3 illustrates a variation on the embodiment of FIG. 2 which is intended to accommodate a situation in which there are restrictions on available axial space in which the spiral adaptor can be received. In this situation the adaptor 64 of FIG. 3 could be utilized, it being noted that the first annular body portion 66 is considerably shorter in axial length than the second annular body portion 68. In this embodiment the first body portion 66 acts only as a locating boss to hold the spiral adaptor in position while the equipment is being assembled, such that the adaptor is self-centering with respect to the seal cavity. With this embodiment the first annular body portion 66 is not long enough to include a circumferential groove and sealing member as is found in the embodiment of FIG. 2.

Figure 4:
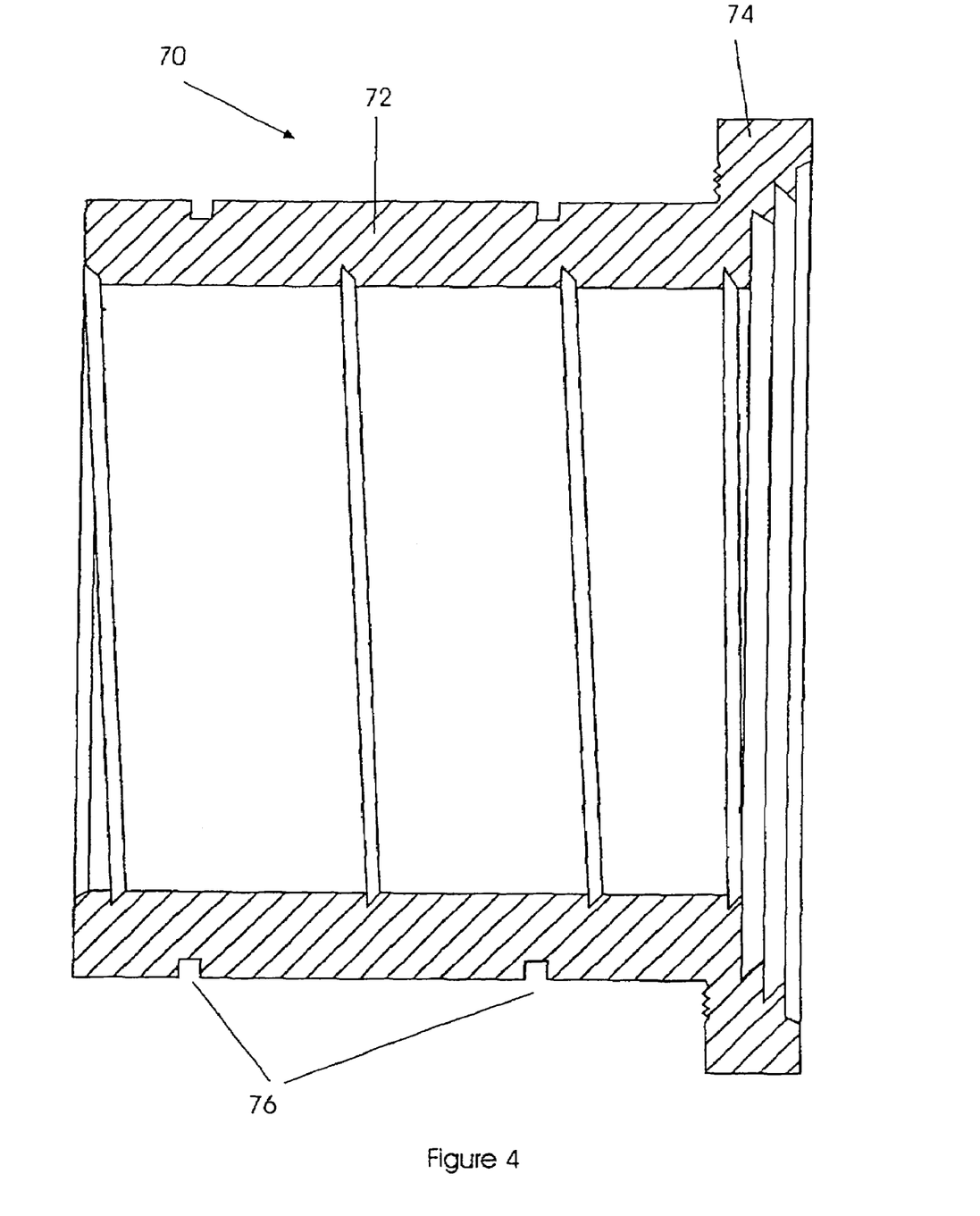
FIG. 4 illustrates in enlarged cross-section a third embodiment of the spiral adaptor of the present invention.

There may be situations in which there is a need to extend the first annular body portion of the spiral adaptor deeply into the seal cavity, perhaps all the way to the bottom 18 thereof. The spiral adaptor 70 of FIG. 4 will accomplish this need in that the first annular portion 72 thereof is considerably longer than the second annular portion 74. The first annular portion 72 is preferably provided with at least two circumferential grooves 76, each of which can receive a suitable sealing member, such as an O-ring as described for the first embodiment, to effect sealing engagement with the outer cylindrical surface 24 of the seal cavity 18.

Figure 5:
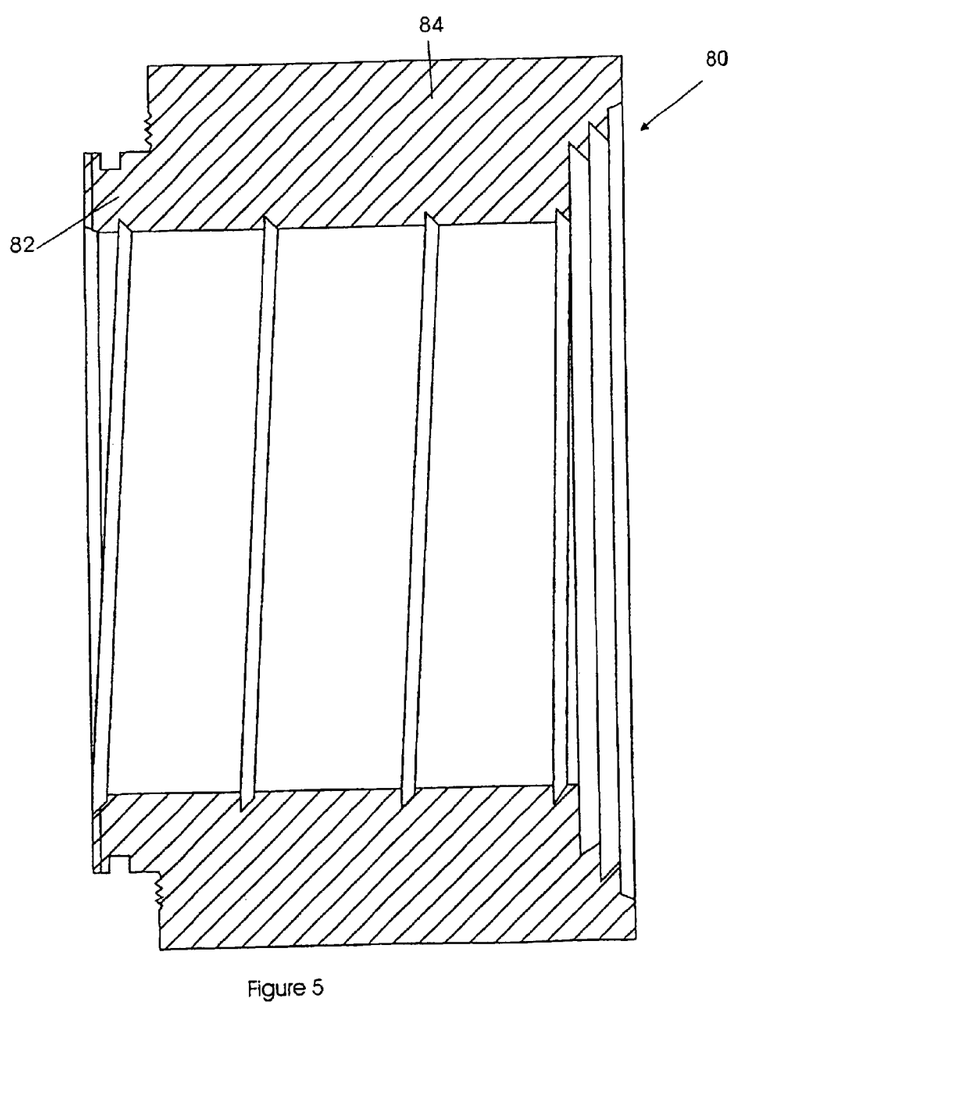
FIG. 5 illustrates in enlarged cross-section a fourth embodiment of the spiral adaptor of the present invention.

There may be situations in which there has been substantial wear on the shaft 12 in the vicinity of the mechanical seal 26 and it becomes desirable to reposition the seal 26 further away from the shaft housing 14 than before. The spiral adaptor 80 of FIG. 5 can be used in these situations, it being noted that the second annular body portion 84 thereof is considerably greater in axial length than the first annular portion 82 thereof. With this embodiment the mechanical seal 26 can be moved outwardly on the shaft 12 to a smoother area of the shaft or seal, with the greater length of the second annular body portion bridging the distance from the housing 14 to the mechanical seal 26. Another advantage to this embodiment is that the mechanical seal is positioned closer to the main bearing support of the equipment where there is less chance of vibration affecting the performance of the seal.

Figure 6:
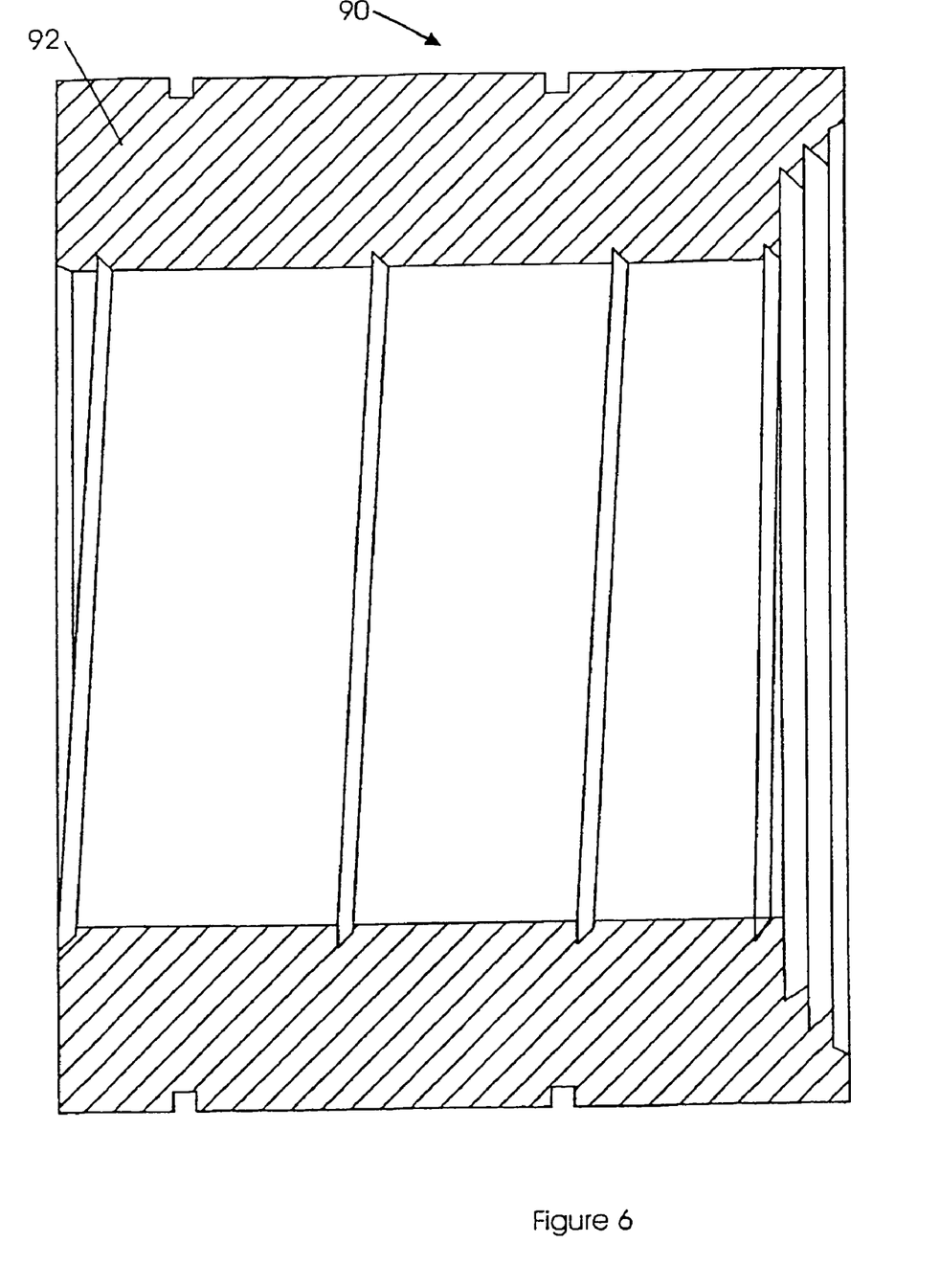
FIG. 6 illustrates in enlarged cross-section a fifth embodiment of the spiral adaptor of the present invention.

It will be appreciated that there are many designs of seal cavities and that not all such designs will conform generally to the typical design illustrated in FIG. 1. One such non-conforming design is the so-called "big bore" design where a larger more expensive mechanical seal is required. By using the spiral adaptor 90 of FIG. 6 it is possible to reduce the radial cross-section of the adaptor, allowing for a smaller, less expensive, mechanical seal to be used. In this case the adaptor body 92 does not include a second annular body portion of diameter greater than that of the first annular body portion, i.e. the body has a single outer diameter over its entire length. Otherwise the features of the adaptor are the same as those of the first embodiment. This arrangement can substantially reduce costs for the customer.

Figure 7:
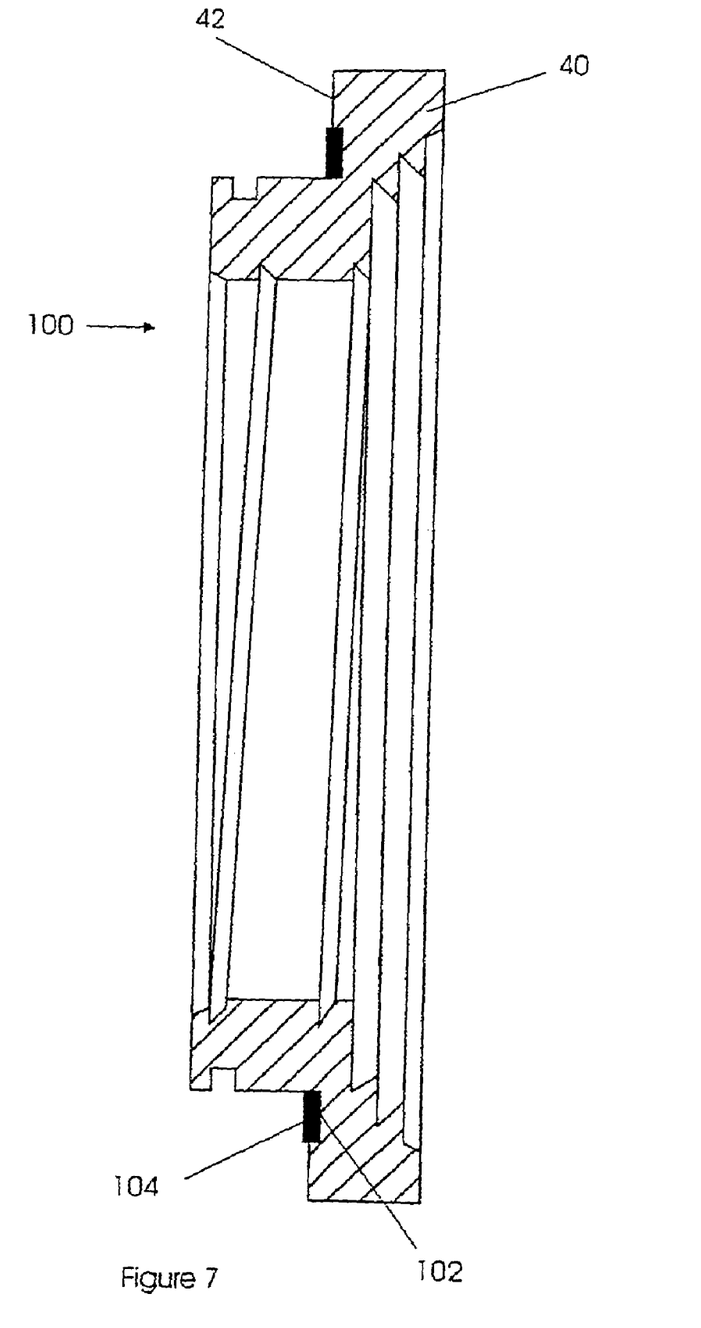
FIG. 7 illustrates in enlarged cross-section a sixth embodiment of the spiral adaptor of the present invention.

FIG. 7 illustrates a spiral adaptor 100 that is advantageous in those situations where the complementary face surface 44 of the shaft housing 14 is eroded or damaged and the ribbed gasket surface 50 will not provide sufficient sealing contact with the face surface 44. In this embodiment an annular groove 102 is machined in the inboard radial surface 42 of the second annular portion 40 and a soft, flexible gasket 104 is positioned in the groove, which gasket will effect suitable sealing contact with the complementary face surface 44. Should the face surface 44 be eroded to the point where neither the ribbed gasket surface 50 nor the separate gasket member 104 is acceptable, the customer may have to machine the face surface 44 back to its original condition before the spiral adaptor is assembled thereto.

Figure 8:
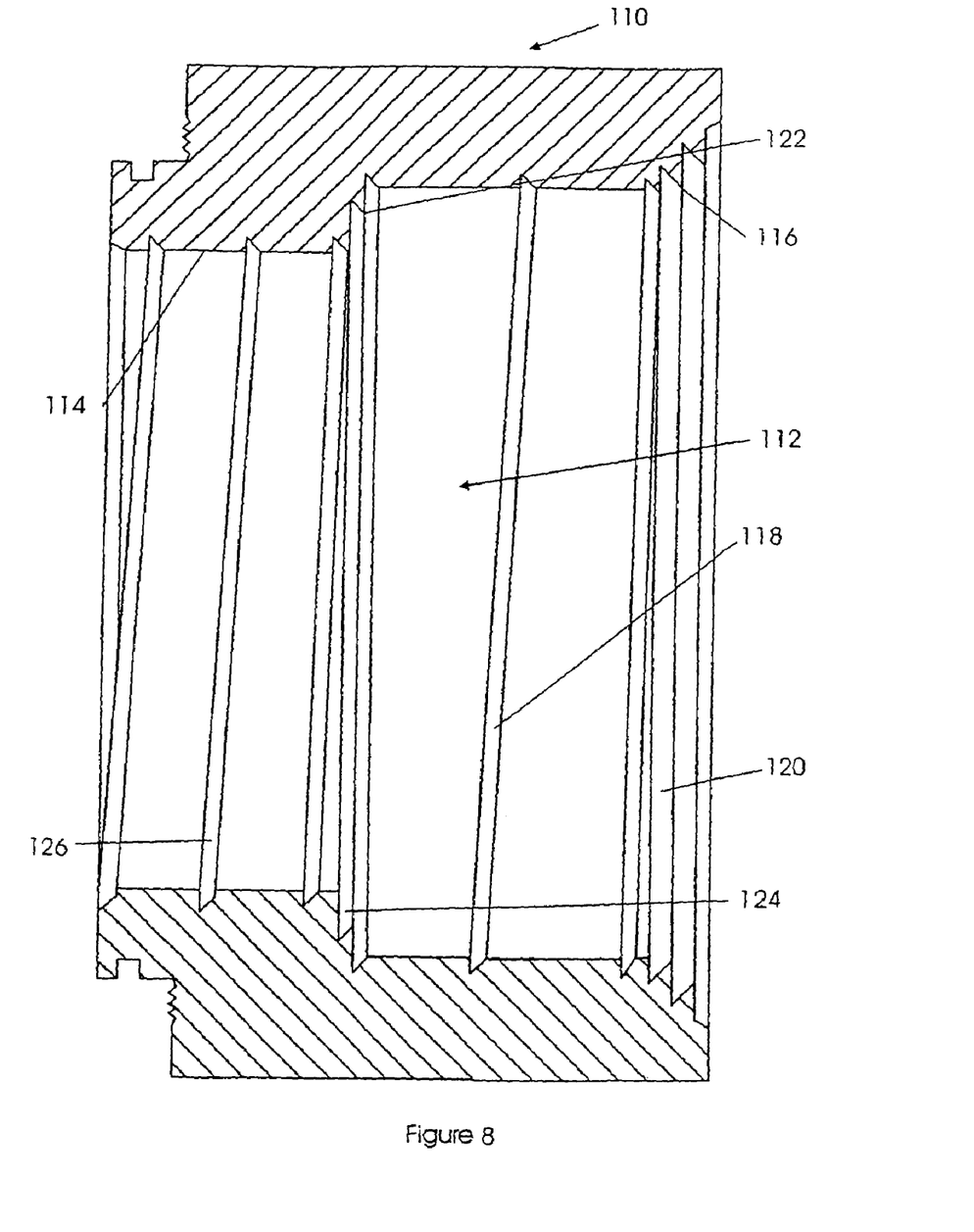
FIG. 8 illustrates in enlarged cross-section a seventh embodiment of the spiral adaptor of the present invention.

Depending on the nature of the mechanical seals with which the present invention will be used it may become necessary to use a spiral adaptor in which the bore opens to the seal closer to the inboard end thereof than in the other embodiments previously described. Thus there could be one or more intermediate bore portions between the first and second bore portions. Such spiral adaptor 110 is illustrated in FIG. 8, where a single intermediate portion 112 is located between the first portion 114 and the second, flared portion 116. The intermediate portion 112 is provided with a spiral groove 118 which leads smoothly into the spiral groove 120 of the flared bore portion 116. The transition 122 between the first bore portion 114 and the intermediate portion 112 is also flared and includes a spiral groove 124, smoothly extending the groove 126 of the first portion 114 to the spiral groove 118 of the intermediate portion. Such an embodiment can be used with mechanical seal arrangements that are axially long, including both single and double mechanical seals. The length of the intermediate portion will be selected to accommodate the physical parameters of the equipment. If more than one intermediate portion becomes necessary such could easily be provided with each such intermediate portion having an increasingly greater diameter as they lead from the first bore portion to the second bore portion of the adaptor.

Figure 9:
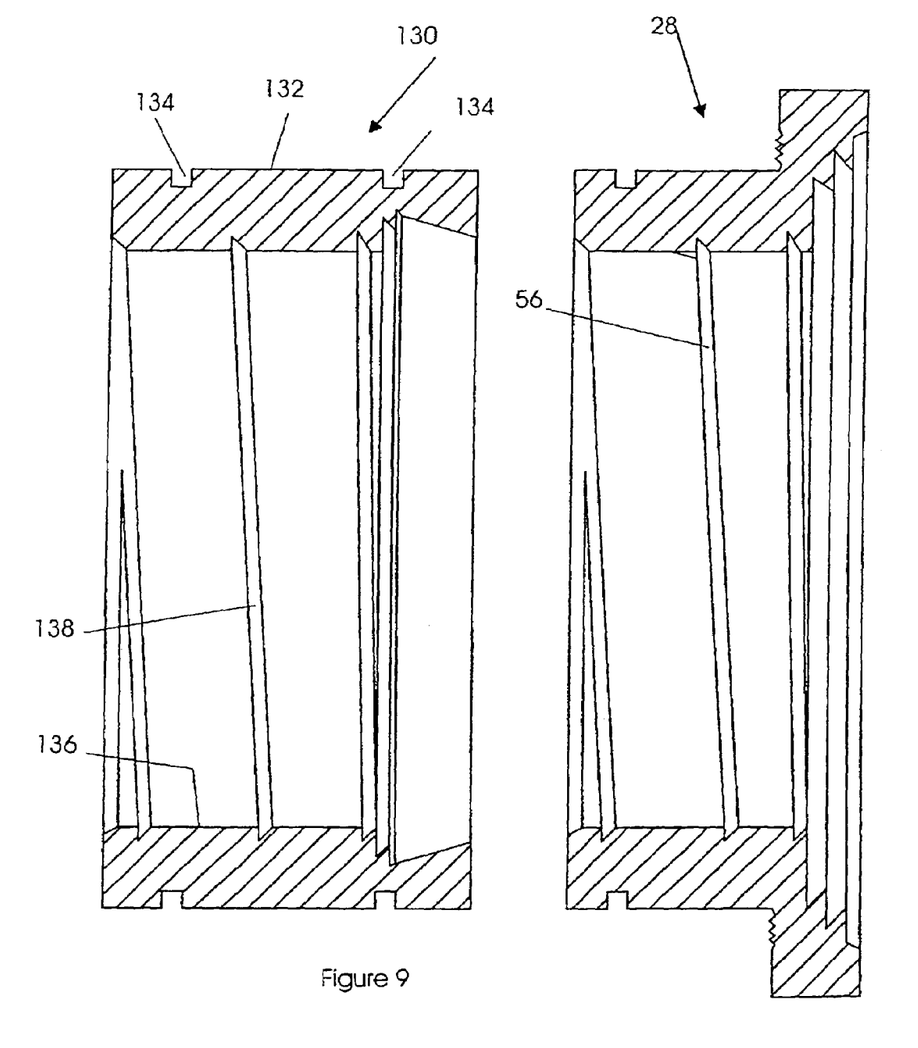
FIG. 9 illustrates in enlarged cross-section an eighth embodiment of the spiral adaptor of the present invention.

Turning now to FIG. 9 there is shown an embodiment which can be used to fill in a seal cavity if it is deemed necessary to do so, or if the cavity has a deep axial length and only a small first obstruction space. The first obstruction space is the physical space that is available for installation of the adaptor when the equipment is completely assembled. For example, the depth of the seal cavity might be 5 inches and the physical space between the end of the seal cavity and the bearing housing of the equipment might be only 3 inches. If the adaptor is provided in two pieces, each being 2.5 inches long then one piece can fit easily within the cavity, in the available 3 inch space for installation. The second piece can then be installed, for a total length of 5 inches.

In this embodiment a spiral adaptor 28 as depicted in FIG. 2 is illustrated in conjunction with a cavity insert 130. The insert 130 has an outer circumferential surface 132 sized for a sliding, tight fit within the cavity, the surface 132 being preferably, but not essentially, provided with at least two circumferential seal member-receiving grooves 134. The inner bore 136 of the insert is provided with a spiral groove 138 having a hand the same as the direction of rotation of the shaft, which groove will merge smoothly with the groove 56 found in the first annular portion of the adaptor 28. With this arrangement particulate material will be prevented from building up within the seal cavity; as particulate material enters the seal cavity they are rejected by the spiral groove 138. The insert 130 will be the first of the pieces mentioned above, the one that is inserted initially into the cavity while an adaptor 28 will be the second piece, the one that is inserted after the first piece to meet the cavity dimensional requirements.

Figure 10:
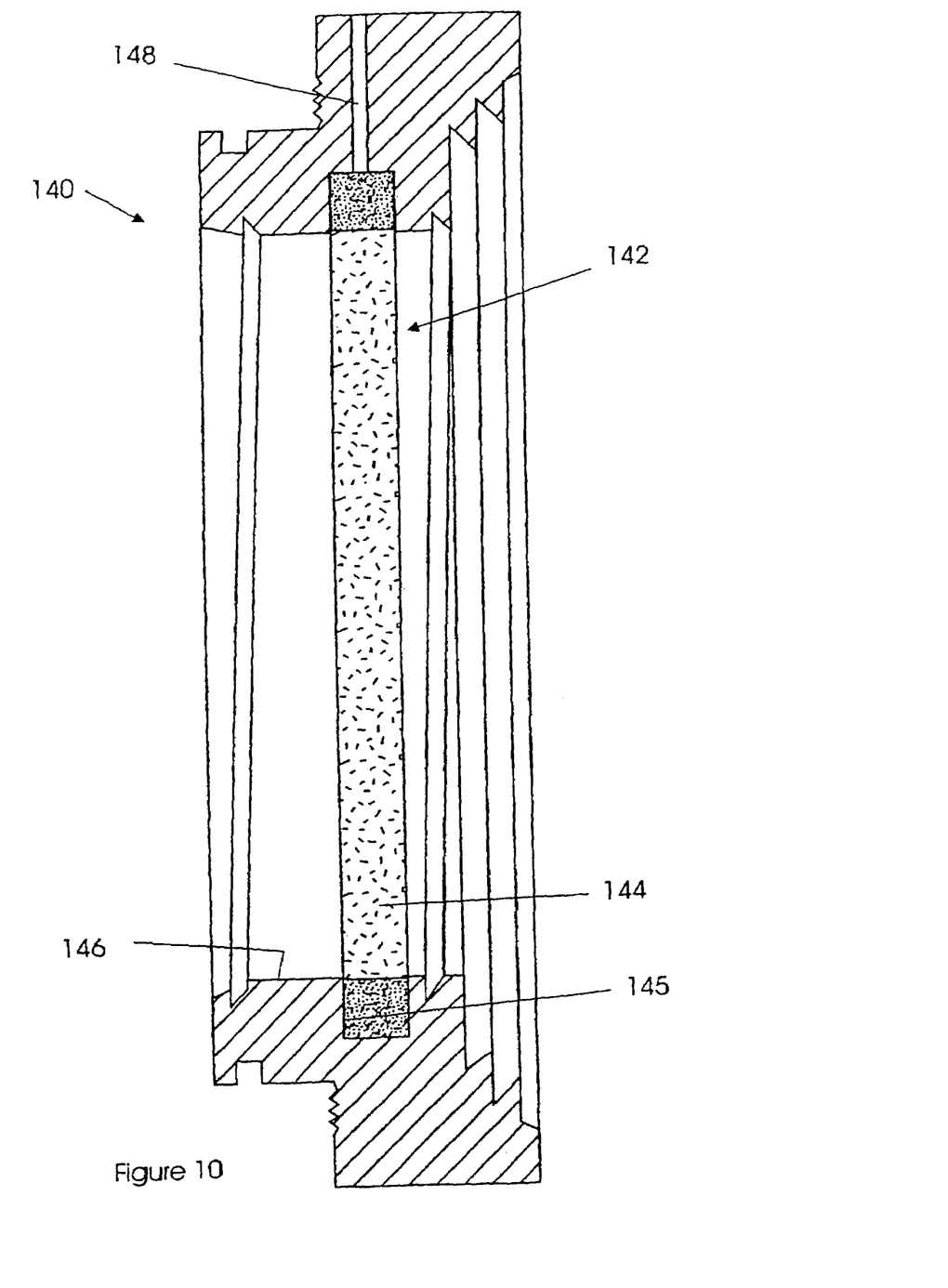
FIG. 10 illustrates in enlarged cross-section a ninth embodiment of the spiral adaptor of the present invention.

FIG. 10 illustrates a spiral adaptor which is especially adapted for use with an "agitator" type of rotary equipment. An agitator is a rotary component that has a large blade assembly that rests inside a larger tank, and rotates to "agitate" or mix the product within the tank. These tanks are common in the pulp and paper industry, the tanks being typically filled with a slurry of paper stock.

The rotary equipment used to effect agitation is prone to breakdown. Whenever there is a problem it is necessary to drain the tank before repairs can be effected to the mechanical seals. By utilizing the embodiment of FIG. 10 it is possible to avoid having to empty the tank before repairs can be effected. The spiral adaptor 140 of FIG. 10 includes all of the standard features as described with respect to the other embodiments and, in addition, it is provided with a shutoff mechanism 142 which when activated will seal itself against the shaft when the shaft has been brought to a halt. The shutoff mechanism 142 could entail a flexible sealant ring 144 held within a circumferential groove 145 in the bore 146 of the adaptor. A radially directed passage or bore 148 would be connected to a source of hydraulic or pneumatic pressure (not shown) which, when activated would force the ring 144 into sealing contact with the shaft. When such a shutoff mechanism is activated with the tank full of product it would not be necessary to drain the tank in order to effect repairs to the mechanical seal.

Figure 11:
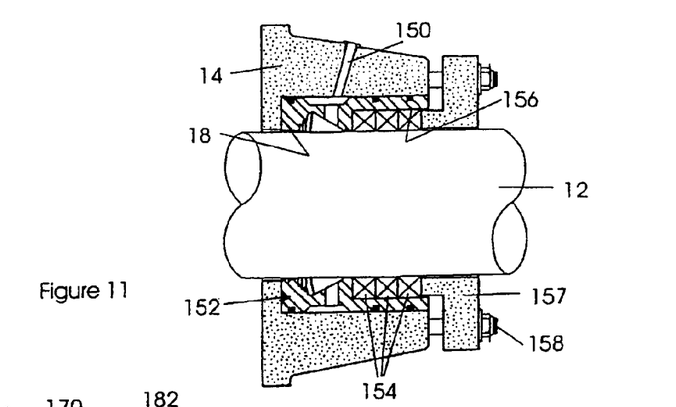
FIG. 11 illustrates in enlarged cross-section a tenth embodiment of the spiral adaptor of the present invention.
Figure 12:
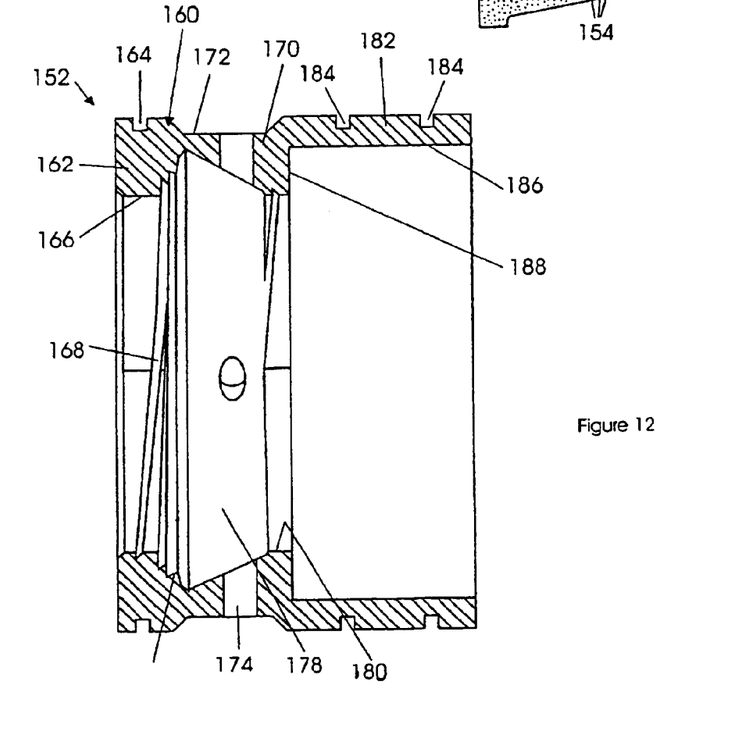
FIG. 12 illustrates in enlarged cross-section the spiral adaptor of the present invention as utilized in the arrangement of FIG. 11.

In some applications the seal cavity might contain packing, with or without a separate mechanical seal, and it could be desirable to continue with such a configuration even when utilizing an externally mountable spiral adaptor of the present invention. FIGS. 11 and 12 illustrate a situation in which packing can be used in conjunction with a spiral adaptor especially adapted for use therewith.

FIG. 11 shows a shaft 12, shaft housing 14 and a seal cavity 18, much as is shown in FIG. 1. The housing 14 includes a passage 150 for feeding flushing fluid to the seal cavity. An annular spiral adaptor 152 is positioned deep within the cavity from the entrance of the cavity and one or more packing rings 154 are forced into an annular cavity 156 defined between the adaptor 152 and the shaft 12, as will be seen from FIG. 12, which shows the adaptor in greater detail. An annular gland plate 157 applies an axial force against the outermost packing ring to hold the rings in position. The gland plate 157 is secured to the housing 14 by threaded bolts 158.

Turning now to FIG. 12, the adaptor 152 is described in greater detail. The annular body 160 of the adaptor 152 has a first annular portion 162 having, preferably, an external circumferential groove 164 for reception of a sealing ring (not shown). The annular portion 162 has a first bore 166 and a spiral groove 168 therein as with the other embodiments. A second annular portion 170 has an outer circumferential groove 172 which communicates with the passage 150 as well as one or more through bores 174 communicating the groove 172 with the interior of the adaptor. An outwardly flaring, spiral grooved section 176 leads from the bore 166 to a radially inwardly tapering bore section 178, which in turn leads to a short straight bore section 180, also provided with a spiral groove 182.

Outboard of the second annular portion 170 there is an annular extension 182 which preferably has at least two circumferential grooves 184 in the outer circumferential surface thereof, each for reception of a sealing ring (not shown). The extension 182 has an enlarged bore 186 which extends inwardly thereof to an annular shoulder 188, against which the innermost of the packing rings 154 will abut once the adaptor and the packing have been assembled to the rotary equipment.

This embodiment is particularly advantageous where there is a large radial cross-section being used, the adaptor being fittable externally into the seal cavity. This embodiment will permit the operator to reduce the diameter of the packing rings being used, while also permitting more packing rings to be used than otherwise. For example, in large equipment it would be possible to go from two rings of 0.750" radial cross-section to three rings of 0.500" radial cross-section. By being able to use more packing rings, of smaller radial cross-section, it is possible to reduce the packing cost without sacrificing sealing efficiency.

Figure 13:
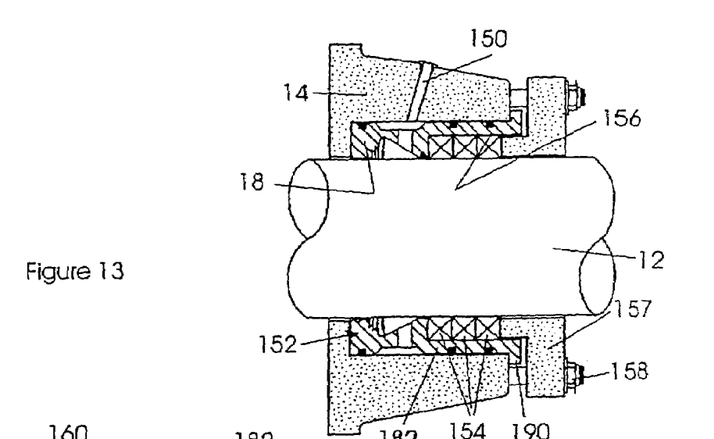
FIG. 13 illustrates in enlarged cross-section an eleventh embodiment of the spiral adaptor of the present invention.
Figure 14:
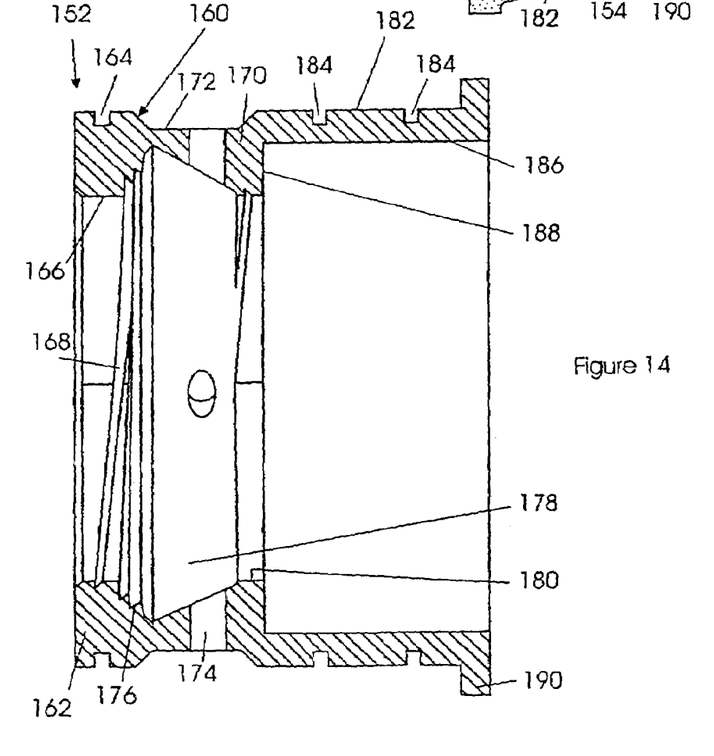
FIG. 14 illustrates in enlarged cross-section the spiral adaptor of the present invention as utilized in the arrangement of FIG. 13.

FIGS. 13 and 14 illustrate a variation on the embodiment of FIGS. 11 and 12. In this embodiment the extension 182 is provided with a radial flange 190 at the outboard end thereof, which flange helps to lengthen the extension 182 and thus will allow for the inclusion of additional packing in the assembly.

With the new arrangement of externally mounting a spiral adaptor, and with the adaptors illustrated herein, particulate or contaminant material around the seal area will be removed or redirected away from the seal cavity. This arrangement will not remove particulate material in the seal cavity having a throat restriction at the bottom thereof. In an open or large bore box, this would not be a problem because there is no restriction in the bottom of the seal cavity. It is expected that a skilled person in the art would be able to modify any of the spiral adaptors illustrated and described herein to accommodate a particular application without departing from the spirit of the present invention. Accordingly the protection to be afforded this invention is to be determined from the claims appended hereto.

The invention claimed is:

1. A seal cavity arrangement for rotating equipment, said arrangement comprising:
an annular seal cavity defined by an outer cylindrical surface of a rotatable shaft of such equipment and a shaft housing surrounding at least a portion of said shaft, said cavity having a bottom end within said housing, an open entrance end opposite said bottom end, and said housing having a cylindrical surface extending from said bottom end to said entrance end;
a mechanical seal positioned outboard of said shaft housing adjacent said entrance end; and
a spiral adaptor comprising:
an annular adaptor body having a central bore therethrough;
a first annular portion of said adaptor body sized for a tight fit within said shaft housing at said entrance end;
a second annular portion of said adaptor body of greater diameter than said first annular portion, said second annular portion having an inboard radial surface adapted for contact with a complementary outer face of said shaft housing and an outboard radial surface adapted for contact with a complementary inner face of said mechanical seal;

said central bore including a first portion defining an annular gap with said shaft outer cylindrical surface when said adaptor is in its operating position and a second portion which flares outwardly from said first bore portion towards said outboard radial surface, said first and second bore portions each including a spiral groove formed therein, the hand thereof being in the same direction as the rotation of said shaft, said groove serving to redirect contaminant material contained in fluids surrounding said shaft away from said seal cavity.

2. The arrangement of claim 1 wherein said first annular portion of said adaptor body has an outer cylindrical surface adapted for said tight fit within said shaft housing, said outer cylindrical surface including a circumferential groove therein for reception of an annular seal member adapted for sealing engagement with said cylindrical surface of said seal cavity.

3. The arrangement of claim 1 wherein said first annular portion of said adaptor body acts as a locating boss for positioning said spiral adaptor at said cavity entrance.

4. The arrangement of claim 1 wherein said inboard radial surface of said second annular portion has a ribbed gasket surface formed integrally therewith for sealing engagement with said complementary face of said shaft housing.

5. The arrangement of claim 1 wherein the axial extent of said first annular portion may be greater than, lesser than or equal to the axial extent of said second annular portion.

6. The arrangement of claim 1 wherein said spiral groove formed in said first bore portion leads smoothly into said spiral groove formed in said second bore portion.

7. The arrangement of claim 1 wherein said spiral groove has radial and non-radial surface portions, the non-radial portion extending into the adaptor body from the adaptor body bore and the radial portion extending generally radially from the inner end of the non-radial portion back towards the adaptor body bore.

8. The arrangement of claim 1 wherein said first annular portion of said adaptor body has an outer cylindrical surface adapted for said tight fit with said shaft housing, said outer cylindrical surface including at least a pair of axially spaced apart circumferential grooves therein, each for reception of an annular seal member adapted for sealing engagement with said cylindrical surface of said shaft housing.

9. The arrangement of claim 1 wherein said inboard radial surface of said second annular portion has an annular groove formed therein for reception of an annular sealing member for sealing engagement with said complementary face of said shaft housing.

10. The arrangement of claim 1 including a shutoff mechanism comprising a circumferential groove formed in said first bore portion, a flexible sealing ring contained within said circumferential groove, and a passage in said annular adaptor body communicating a source of pressurized fluid with said circumferential groove for pressing said flexible ring against said shaft.

11. The arrangement of claim 1 in combination with an insert positionable within said seal cavity adjacent the bottom end thereof, said insert comprising an annular insert body receivable within said seal cavity and having a central bore therethrough, said central bore including a first portion defining an annular gap with said shaft outer cylindrical surface when said insert is in its operating position and a second portion which flares outwardly from said first bore portion towards and outboard end of said insert, said first and second bore portions of said insert each including a spiral groove formed therein, the hand thereof being in the same direction as the rotation of said shaft, said groove serving to redirect contaminant material contained in fluids within said seal cavity towards said spiral adaptor.

12. The arrangement of claim 1 wherein said central bore includes an intermediate portion between said first and second portions and of diameter greater than that of said first portion, there being a flared transition section between said first and intermediate portions, said intermediate and flared transition portions each having a spiral groove therein.

* * * * *